United States Patent
Tanaka

(10) Patent No.: US 9,749,559 B2
(45) Date of Patent: Aug. 29, 2017

(54) SOLID-STATE IMAGE SENSOR, IMAGE PICKUP APPARATUS, AND CORRECTING METHOD

(71) Applicant: Sony Corporation, Tokyo (JP)

(72) Inventor: Hiromichi Tanaka, Fukuoka (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/340,330

(22) Filed: Jul. 24, 2014

(65) Prior Publication Data

US 2015/0036028 A1   Feb. 5, 2015

(30) Foreign Application Priority Data

Jul. 31, 2013  (JP) ................................. 2013-158559

(51) Int. Cl.
  *H04N 5/361*   (2011.01)
  *H04N 5/217*   (2011.01)

(52) U.S. Cl.
  CPC .......... *H04N 5/361* (2013.01); *H04N 5/2176* (2013.01)

(58) Field of Classification Search
  None
  See application file for complete search history.

(56) References Cited

U.S. PATENT DOCUMENTS

| | | | | |
|---|---|---|---|---|
| 6,304,292 B1* | 10/2001 | Ide | ................... | H01L 27/14868 257/E27.159 |
| 6,791,615 B1* | 9/2004 | Shiomi | ................ | H04N 3/1575 348/218.1 |
| 2008/0054320 A1* | 3/2008 | Solhusvik | ............ | H04N 5/3575 257/292 |
| 2008/0218615 A1* | 9/2008 | Huang | ................. | H04N 5/2175 348/294 |
| 2008/0231732 A1* | 9/2008 | Kinoshita | ............ | H04N 5/3595 348/241 |
| 2009/0091641 A1* | 4/2009 | Hattori | ................... | H04N 5/361 348/241 |
| 2014/0313378 A1* | 10/2014 | Yuen | ...................... | H04N 5/365 348/272 |
| 2014/0354862 A1* | 12/2014 | Inoue | ................... | H04N 5/3572 348/243 |

* cited by examiner

*Primary Examiner* — Roberto Velez
*Assistant Examiner* — Quan Pham
(74) *Attorney, Agent, or Firm* — Sheridan Ross P.C.

(57) ABSTRACT

Provided is a solid-state image sensor, including: a pixel unit including a valid pixel area and an optical-black pixel area; a plurality of reading units configured to read pixel values of a large number of pixels of the pixel unit line by line; a plurality of correction data generating units corresponding to the plurality of reading units, respectively, each of the plurality of correction data generating units being configured to generate correction data based on pixel values read from the optical-black pixel area out of the pixel values read from the pixel unit by the corresponding reading unit line by line; and a correcting unit configured to correct pixel values read from the valid pixel area out of the pixel values read from the pixel unit by the reading unit line by line based on the correction data generated by the corresponding correction data generating unit.

5 Claims, 10 Drawing Sheets

| Gr | B | Gr | B | Gr | B | Gr | B |
|----|---|----|---|----|---|----|---|
| R | Gb | R | Gb | R | Gb | R | Gb |
| Gr | B | Gr | B | Gr | B | Gr | B |
| R | Gb | R | Gb | R | Gb | R | Gb |
| Gr | B | Gr | B | Gr | B | Gr | B |
| R | Gb | R | Gb | R | Gb | R | Gb |
| Gr | B | Gr | B | Gr | B | Gr | B |
| R | Gb | R | Gb | R | Gb | R | Gb |
| Gr | B | Gr | B | Gr | B | Gr | B |
| R | Gb | R | Gb | R | Gb | R | Gb |
| Gr | B | Gr | B | Gr | B | Gr | B |
| R | Gb | R | Gb | R | Gb | R | Gb |
| Gr | B | Gr | B | Gr | B | Gr | B |
| R | Gb | R | Gb | R | Gb | R | Gb |

FIG.2

SOLID-STATE IMAGE SENSOR, IMAGE PICKUP APPARATUS, AND CORRECTING METHOD

CROSS REFERENCE TO RELATED APPLICATIONS

This application claims the benefit of Japanese Priority Patent Application JP 2013-158559 filed Jul. 31, 2013, the entire contents of which are incorporated herein by reference.

BACKGROUND

The present disclosure relates to a solid-state image sensor, an image pickup apparatus, and a correcting method. Specifically, the present disclosure relates to a solid-state image sensor, an image pickup apparatus, and a correcting method capable of correcting variable characteristics of pixels, which may be generated in a case where data output from sets of a plurality of pixels are controlled separately.

In the past, a solid-state image sensor such as a CCD or a CMOS may output an image signal including streak components (line noise) resulting from variable characteristics of the pixels of the solid-state image sensor and the like. That is, so-called streaking may occur.

As measures against this phenomenon, an analog circuit configured to reduce variations of characteristics of pixels is mounted in the solid-state image sensor. A method of removing variations of characteristics of pixels by an ISP (Image Signal Processor) at the latter stage of the solid-state image sensor is also known (for example, see Japanese Patent Application Laid-open No. 2006-157953).

SUMMARY

However, according to the method of providing an analog circuit, although variations of characteristics of pixels are reduced, there is a limit on reduction of variations depending on various reasons such as cost-effectiveness, column pitches, and specifications of a comparator. As a result, recognizable variations are remained in an image signal.

Meanwhile, according to the method of correcting variable characteristics of pixels by an ISP, a streak generated in an image signal may be removed. However, in a case where a solid-state image sensor controls data output from sets of a huge number of pixels separately (for example, in a case where a solid-state image sensor controls data output from pixels of the upper half and data output from pixels of the lower half separately), because the ISP has no information on the fact that the solid-state image sensor is separately controlled, the ISP is incapable of removing variable characteristics of the pixels resulting from the fact that the solid-state image sensor is separately controlled.

In view of the above-mentioned circumstances, it is desirable to inhibit variable characteristics of pixels in a case where data output from sets of a huge number of pixels of a solid-state image sensor are controlled separately.

According to a first embodiment of the present disclosure, there is provided a solid-state image sensor, including: a pixel unit including a valid pixel area and an optical-black pixel area; a plurality of reading units configured to read pixel values of a large number of pixels of the pixel unit line by line; a plurality of correction data generating units corresponding to the plurality of reading units, respectively, each of the plurality of correction data generating units being configured to generate correction data based on pixel values read from the optical-black pixel area out of the pixel values read from the pixel unit by the corresponding reading unit line by line; and a correcting unit configured to correct pixel values read from the valid pixel area out of the pixel values read from the pixel unit by the reading unit line by line based on the correction data generated by the corresponding correction data generating unit.

Each of the correction data generating units may be configured to obtain an average of pixel values of all the colors read from the optical-black pixel area out of the pixel values read from the pixel unit by the reading units line by line to thereby generate a streak correction amount, and the correcting unit may be configured to calculate differences between pixel values read from the valid pixel area out of the pixel values read from the pixel unit by the reading units line by line and the streak correction amount generated by the corresponding correction data generating unit.

Each of the correction data generating units may be configured to obtain, for each color, an average of pixel values of each color read from the optical-black pixel area out of the pixel value read from the pixel unit by the reading units line by line to thereby generate color-step correction amounts, and the correcting unit may be configured to calculate differences between pixel values of each color read from the valid pixel area out of the pixel values read from the pixel unit by the reading units line by line and a color-step correction amount of each color generated by the corresponding correction data generating unit.

According to the first embodiment of the present disclosure, the solid-state image sensor may further include an offset adding unit configured to add the differences calculated by the correcting unit to an offset value to thereby calculate output values.

According to a second embodiment of the present disclosure, there is provided an image pickup apparatus, including: a solid-state image sensor including a pixel unit including a valid pixel area and an optical-black pixel area, a plurality of reading units configured to read pixel values of a large number of pixels of the pixel unit line by line, a plurality of correction data generating units corresponding to the plurality of reading units, respectively, each of the plurality of correction data generating units being configured to generate correction data based on pixel values read from the optical-black pixel area out of the pixel values read from the pixel unit by the reading units line by line, and a correcting unit configured to correct pixel values read from the valid pixel area out of the pixel values read from the pixel unit by the reading unit line by line based on the correction data generated by the corresponding correction data generating unit.

According to a third embodiment of the present disclosure, there is provided a correcting method employed by a solid-state image sensor including a pixel unit including a valid pixel area and an optical-black pixel area, and a plurality of reading units configured to read pixel values of a large number of pixels of the pixel unit line by line, the correcting method including: generating correction data based on pixel values read from the optical-black pixel area out of the pixel values read from the pixel unit by the plurality of reading units line by line for each of the plurality of reading units; and correcting pixel values read from the valid pixel area out of the pixel values read from the pixel unit by the reading unit line by line based on the corresponding correction data.

According to the first to third embodiments of the present disclosure, correction data is generated based on pixel values read from the optical-black pixel area out of the pixel values read from the pixel unit by the plurality of reading units line by line for each of the plurality of reading units, and pixel values read from the valid pixel area out of the pixel values read from the pixel unit by the reading unit line by line are corrected based on the corresponding correction data.

According to the first to third embodiments of the present disclosure, it is possible to inhibit variable characteristics of pixels in a case where data output from sets of a huge number of pixels of a solid-state image sensor are controlled separately.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 2 is a diagram showing an example of the colors arranged in a pixel unit;

DETAILED DESCRIPTION OF EMBODIMENTS

Hereinafter, an embodiment of the present disclosure will be described with reference to the drawings.
<Embodiment>
[Example of Configuration of Image Sensor]

Figure 1:
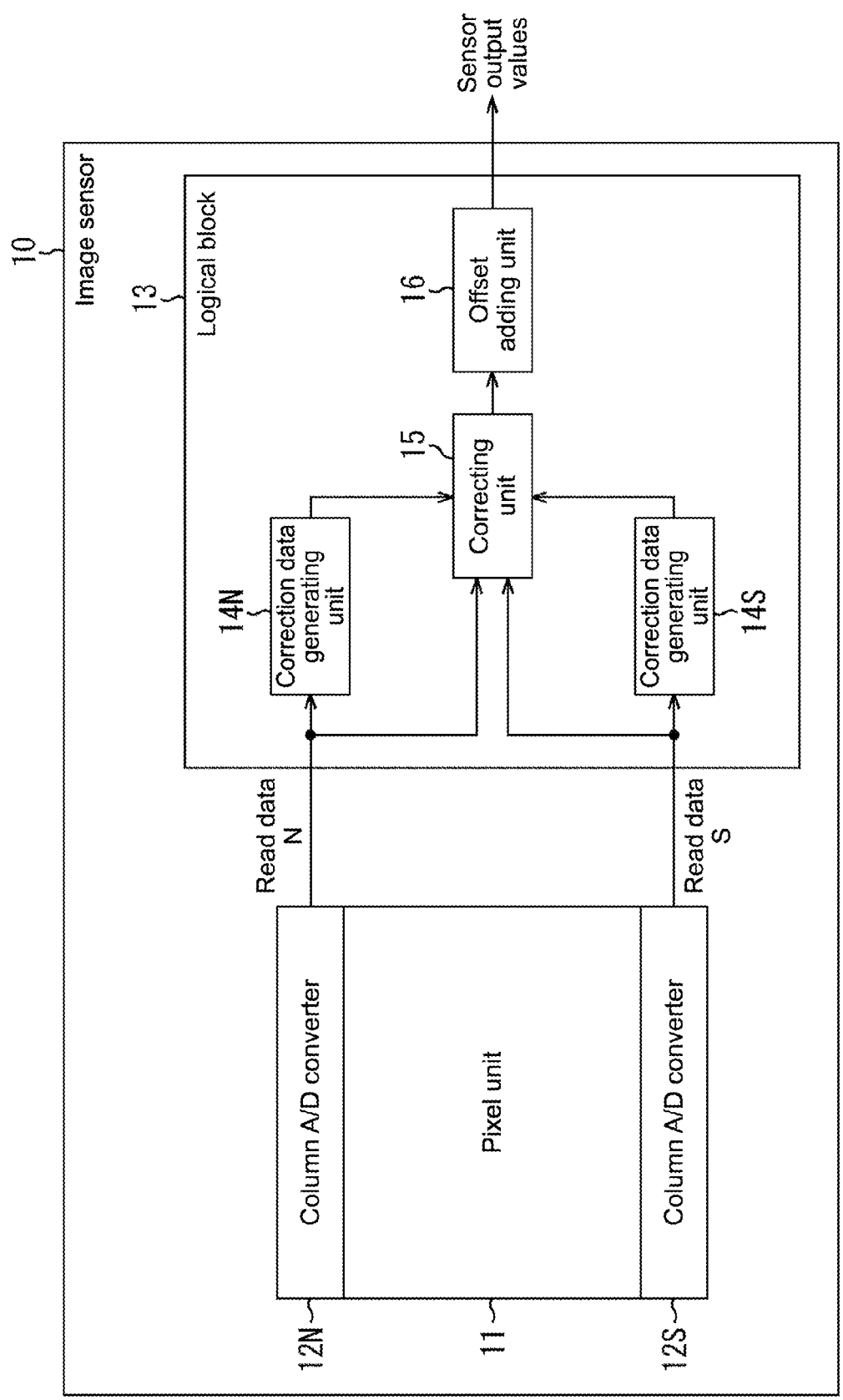
FIG. 1 is a block diagram showing an example of the configuration of an image sensor according to the present disclosure.

FIG. 1 shows an example of the configuration of an image sensor (solid-state image sensor) according to an embodiment of the present disclosure. The image sensor 10 may be mounted on an image pickup apparatus such as a digital still camera or a digital video camera, or an electronic apparatus having an image pickup function.

The image sensor 10 includes the pixel unit 11, the column A/D converters 12N and 12S, and the logical block 13.

The pixel unit 11 includes a huge number of pixels arrayed in a matrix. Each pixel converts optical information into an electric signal. FIG. 2 shows an example of the arrangement of colors of the pixels of the pixel unit 11. According to the example of FIG. 2, two kinds of lines are arranged alternately in the vertical direction. The line of one kind includes R and Gr pixels arranged alternately in the horizontal direction. The line of the other kind includes B and Gb pixels arranged alternately in the horizontal direction.

Figure 3:
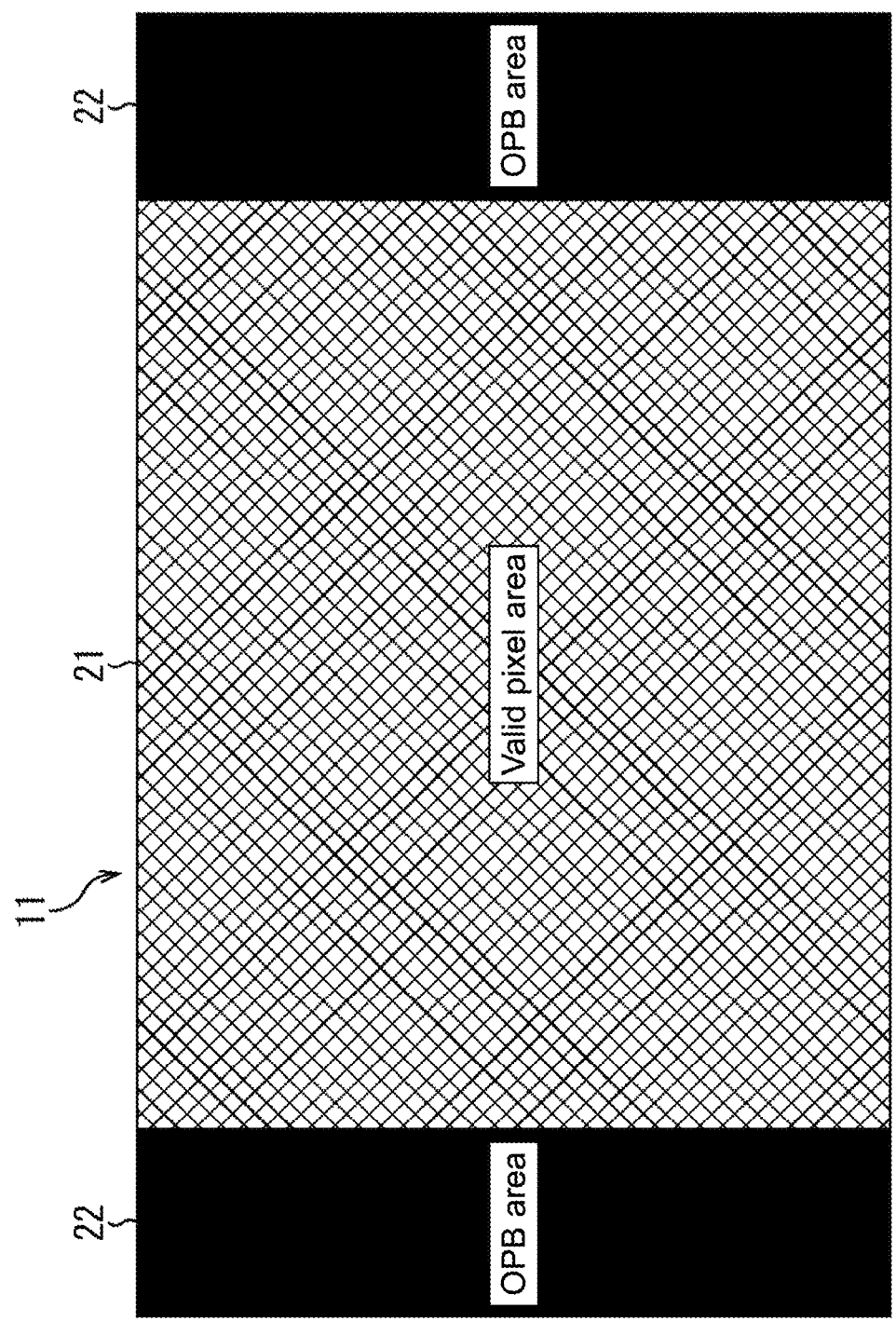
FIG. 3 is a diagram showing optical-black (OPB) areas and a valid pixel area arranged on the pixel unit.

FIG. 3 shows the valid pixel area 21 and the optical-black pixel areas (hereinafter referred to as OPB areas) 22 arranged on the pixel unit 11.

The valid pixel area 21 fills the great part of the pixel unit 11. Pixels for detecting actual data are arrayed in the valid pixel area 21. The actual data is to be output as an image signal. The size of the valid pixel area 21 is determined depending on the angle of view of an output image signal. The OPB areas 22 fill the both sides of the pixel unit 11. Pixels for detecting correction data are arrayed in the OPB areas 22. The correction data is used to correct an image signal detected by the valid pixel area 21. The larger the size of each OPB area 22, the higher the accuracy of correction data.

The column A/D converter 12N reads one of the half of the whole lines of the pixel unit 11 line by line. The column A/D converter 12S reads the other half of the whole lines of the pixel unit 11 line by line. For example, the column A/D converter 12N reads photoelectrically-converted electric signals of pixels on each line of the upper half of the whole lines of the pixel unit 11 in the column direction. The column A/D converter 12N converts the read analog signals into digital signals to thereby obtain pixel values (hereinafter also referred to as read data N). The column A/D converter 12N outputs the pixel values (read data N) to the correction data generating unit 14N and the correcting unit 15. Similarly, the column A/D converter 12S reads photoelectrically-converted electric signals of pixels on each line of the lower half of the whole lines of the pixel unit 11 in the column direction. The column A/D converter 12S converts the read analog signals into digital signals to thereby obtain pixel values (hereinafter also referred to as read data S). The column A/D converter 12S outputs the pixel values (read data S) to the correction data generating unit 14S and the correcting unit 15. Note that the column A/D converter 12N may not read the upper-half lines of the pixel unit 11, and the column A/D converter 12S may not read the lower-half lines of the pixel unit 11. Alternatively, for example, the column A/D converter 12N may read the even lines, and the column A/D converter 12S may read the odd lines. Each column A/D converter may read arbitrary lines.

The correction data generating unit 14N calculates a streak correction amount, R step-correction values, Gr step-correction values, Gb step-correction values, and B step-correction values based on the pixel values of the pixels of the upper-half lines in the OPB areas 22, which are input from the column A/D converter 12N. The correction data generating unit 14N outputs the streak correction amount, the R step-correction values, the Gr step-correction values, the Gb step-correction values, and the B step-correction values to the correcting unit 15. The streak correction amount is used for streak correction processing (described later) and color-step correction processing (described later). The R step-correction values, the Gr step-correction values, the Gb step-correction values, and the B step-correction values are used for the color-step correction processing. The correction data generating unit 14S calculates a streak correction amount, R step-correction values, Gr step-correction values, Gb step-correction values, and B step-correction values based on the pixel values of the pixels of the lower-half lines in the OPB areas 22, which are input from the column A/D converter 12S. The correction data generating unit 14S outputs the streak correction amount, the R step-correction values, the Gr step-correction values, the Gb step-correction values, and the B step-correction values to the correcting unit 15. The streak correction amount is used for the streak correction processing and the color-step correction processing. The R step-correction values, the Gr step-correction values, the Gb step-correction values, and the B step-correction values are used for the color-step correction processing.

Hereinafter, if it is not necessary to distinguish the column A/D converter 12N and the column A/D converter 12S from one another, each of them is simply referred to as the column A/D converter 12. Similarly, if it is not necessary to distinguish the correction data generating unit 14N and the correction data generating unit 14S from one another, each of them is simply referred to as the correction data generating unit 14.

Note that, according to this embodiment, the two column A/D converters 12 and the two correction data generating units 14 are provided. Alternatively, more than two column A/D converters 12 and more than two correction data generating units 14 may be provided. With this configuration, it is possible to read electric signals from the pixel unit 11 at higher speed. However, the A/D conversion characteristics of one column A/D converter 12 differ from the A/D conversion characteristics of another column A/D converter 12. Because of this, it is necessary for each pair of the column A/D converter 12 and the correction data generating unit 14 to execute color-step correction processing (described later) independently.

In the streak correction processing, the correcting unit 15 calculates the differences between pixel values of the pixels in the valid pixel area 21 and a streak correction amount input from the correction data generating unit 14N or 14S for each line. The correcting unit 15 outputs the result (i.e., streak-corrected pixel values) to the offset adding unit 16.

Further, in the color-step correction processing, the correcting unit 15 calculates the differences of color-step correction amounts and the streak correction amount input from the correction data generating unit 14N or 14S for each line. The correcting unit 15 adds the differences to pixel values of the pixels in the valid pixel area 21. The correcting unit 15 outputs the result (i.e., color-step-corrected pixel values) to the offset adding unit 16.

The offset adding unit 16 adds a predetermined offset value to the streak-corrected pixel values of the valid pixel area 21 input from the correcting unit 15, and outputs the result (i.e., streak-corrected sensor output values) to the latter stage. The offset adding unit 16 adds a predetermined offset value to the color-step-corrected pixel values of the valid pixel area 21 input from the correcting unit 15, and outputs the result (i.e., color-step-corrected sensor output values) to the latter stage.

[Streak Correction Processing]

Figure 4:
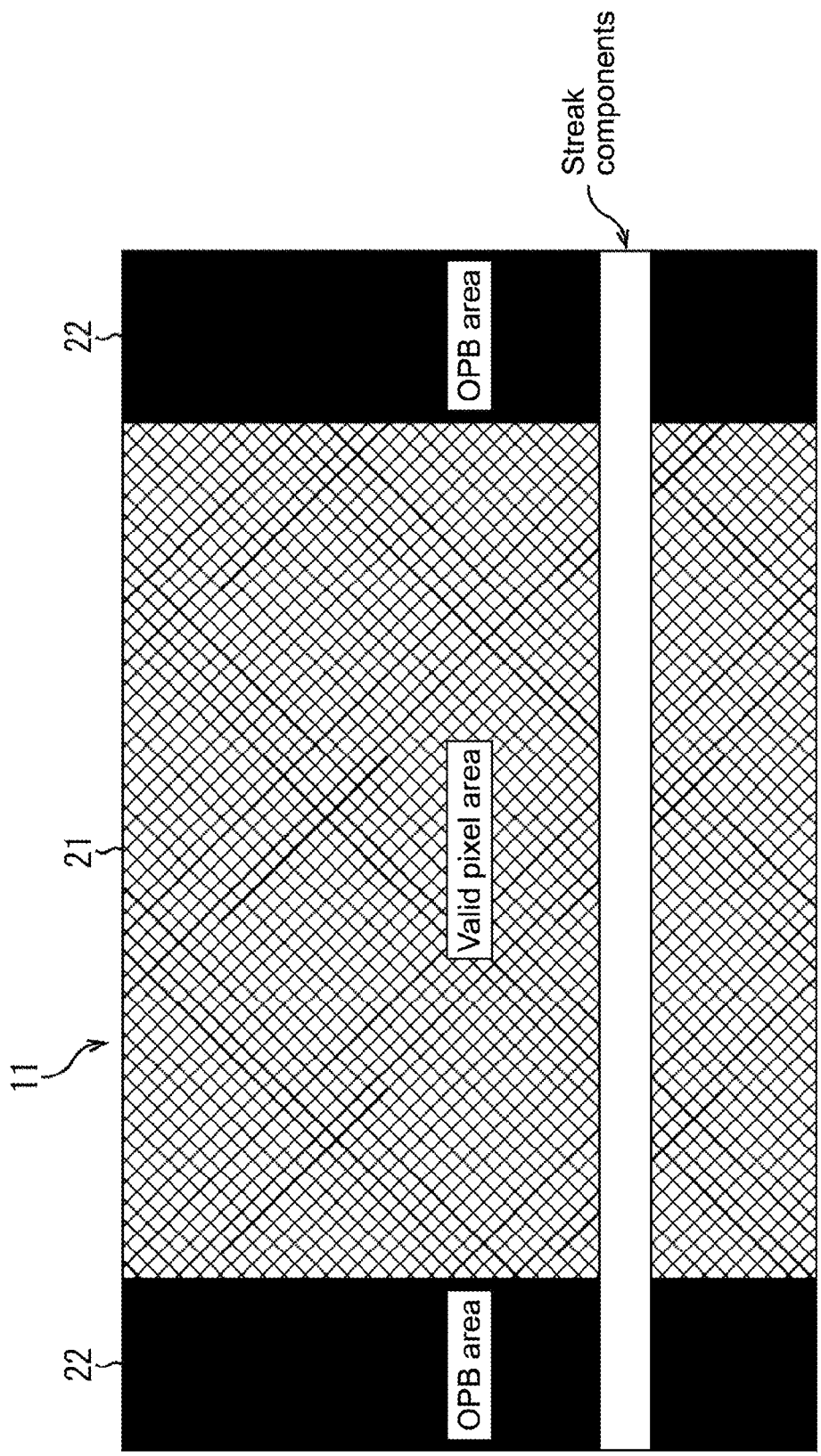
FIG. 4 is a diagram schematically showing streak components generated in an image signal.

Next, the streak correction processing will be described. FIG. 4 schematically shows streak components (line noise) generated in an image signal. That is, streak components are generated not only in the valid pixel area 21 but also in the OPB areas 22 on the same line. In view of this, according to the present disclosure, the following streak correction processing is employed. That is, streak components generated in pixel values of pixels in the valid pixel area 21 are corrected based on the pixel values of the pixels on each line in the OPB areas 22.

Figure 5:
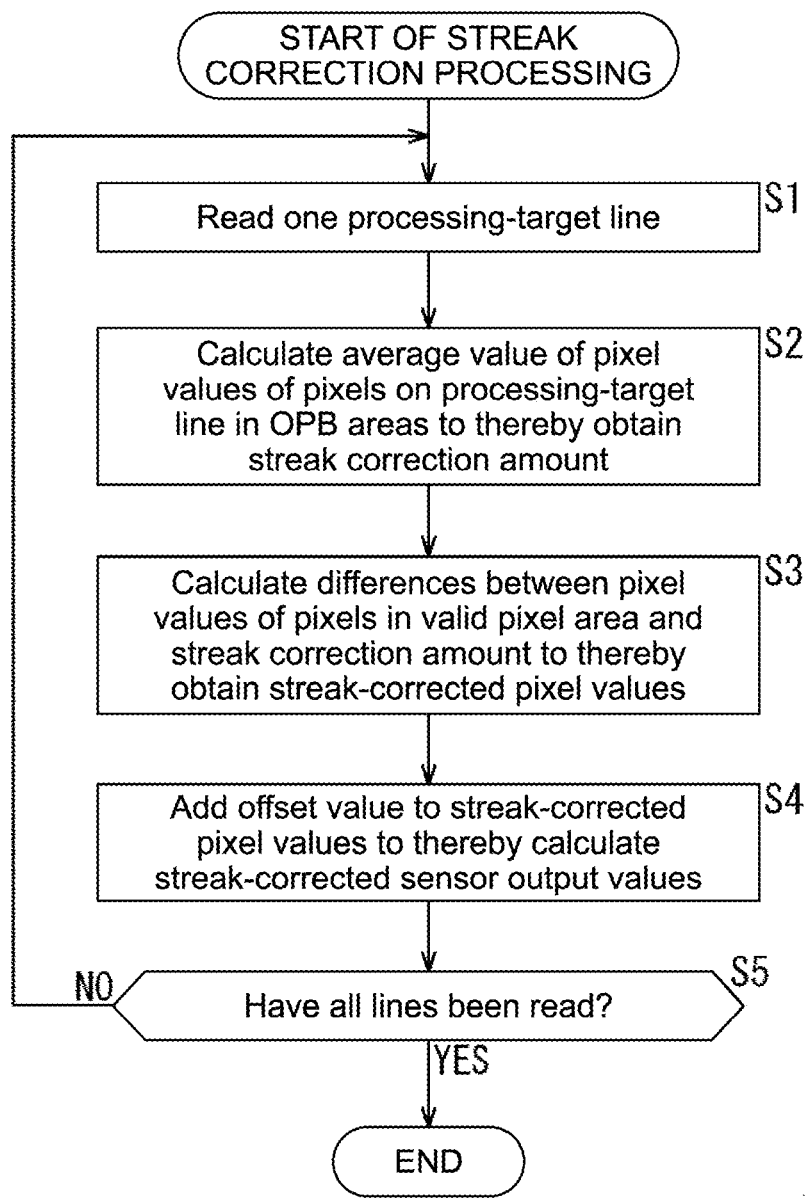
FIG. 5 is a flowchart illustrating streak correction processing.

FIG. 5 is a flowchart illustrating the streak correction processing. In the streak correction processing, all the lines (pixel lines in the horizontal direction) of the pixel unit 11 are selected as processing targets and processed in order.

In Step S1, the column A/D converter 12N reads electric signals from all the pixels on one processing-target line in the upper half of the pixel unit 11. The column A/D converter 12N converts the analog electric signals to digital electric signals to thereby obtain pixel values (read data N). The column A/D converter 12N outputs the pixel values (read data N) to the correction data generating unit 14N and the correcting unit 15. The column A/D converter 12S executes Step S1 in the similar manner.

In Step S2, the correction data generating unit 14N calculates a streak correction amount, and outputs the streak correction amount to the correcting unit 15. The streak correction amount is the average value of the pixel values of all the pixels on the one line in the OPB areas 22 input from the column A/D converter 12N, irrespective of the color of the pixels. The column A/D converter 12S executes Step S2 in the similar manner.

In Step S3, the correcting unit 15 calculates the differences between the pixel values of the pixels on the processing-target line in the valid pixel area 21 of the upper half of the image and the streak correction amount from the correction data generating unit 14N. The correcting unit 15 outputs the result (i.e., streak-corrected pixel values) to the offset adding unit 16. Further, the correcting unit 15 calculates the differences between the pixel values of the pixels on the processing-target line in the valid pixel area 21 of the lower half of the image and the streak correction amount from the correction data generating unit 14S. The correcting unit 15 outputs the result (i.e., streak-corrected pixel values) to the offset adding unit 16.

In Step S4, the offset adding unit 16 adds a predetermined offset value to the streak-corrected pixel values of the respective pixels input from the correcting unit 15, to thereby calculate streak-corrected sensor output values of the respective pixels. The offset adding unit 16 outputs the streak-corrected sensor output values to the latter stage.

In Step S5, it is determined if all the lines of the pixel unit 11 have been selected as processing targets or not. If NO in Step S5 (there remains a line, which has never been selected as a processing target), the processing returns to Step S1 and the subsequent steps are executed. To the contrary, if YES in Step S5 (there remains no line, which has never been selected as a processing target), the streak correction processing is completed.

Figure 6:
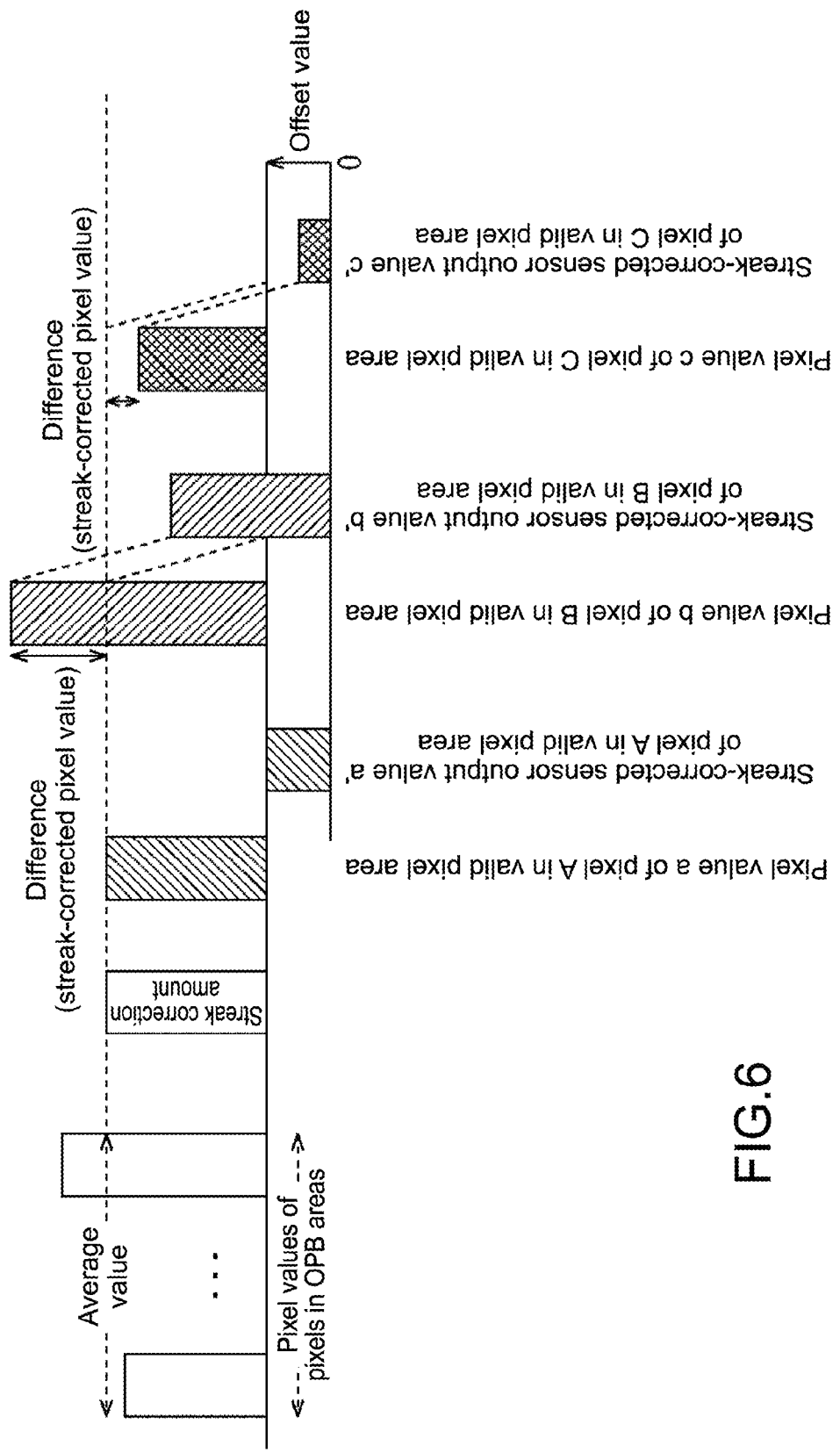
FIG. 6 is a diagram showing a specific example of the streak correction processing.

FIG. 6 shows a specific example of the streak correction processing for pixels A, B, and C on one line in the valid pixel area 21.

For example, the difference between the pixel value a of the pixel A output from the column A/D converter 12 and the streak correction amount is 0 (=a−streak correction amount). As a result, the streak-corrected pixel value of the pixel A is 0. The streak-corrected sensor output value a' of the pixel A is the same as the offset value.

Further, for example, the difference between the pixel value b of the pixel B output from the column A/D converter 12 and the streak correction amount is positive (=b−streak correction amount). As a result, the streak-corrected pixel value of the pixel B is positive. The streak-corrected sensor output value b' of the pixel B is larger than the offset value.

Further, for example, the difference between the pixel value c of the pixel C output from the column A/D converter 12 and the streak correction amount is negative (=c−streak correction amount). As a result, the streak-corrected pixel value of the pixel C is negative. The streak-corrected sensor output value c' of the pixel C is smaller than the offset value.

According to the above-mentioned streak correction processing, each of the plurality of column A/D converters 12 calculates streak correction amounts independently. With this configuration, it is possible to remove streak components to be generated in an image signal appropriately and rapidly.

[Color-step Correction Processing]

Figure 7:
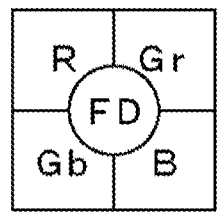
FIG. 7 is a diagram showing a case where four pixels shares one FD.

Next, the color-step correction processing will be described. FIG. 7 shows the case where a plurality of pixels (four pixels of R, Gr, B, and Gb in FIG. 7) of the pixel unit 11 share an FD. In this case, the characteristics of one pixel may differ from the characteristics of the other pixel, the pixels sharing one FD. Because of this, even if those pixels are irradiated with light having the same intensity, those pixels may output different pixel values. The color-step correction processing is executed to correct such different pixel values.

Figure 8:
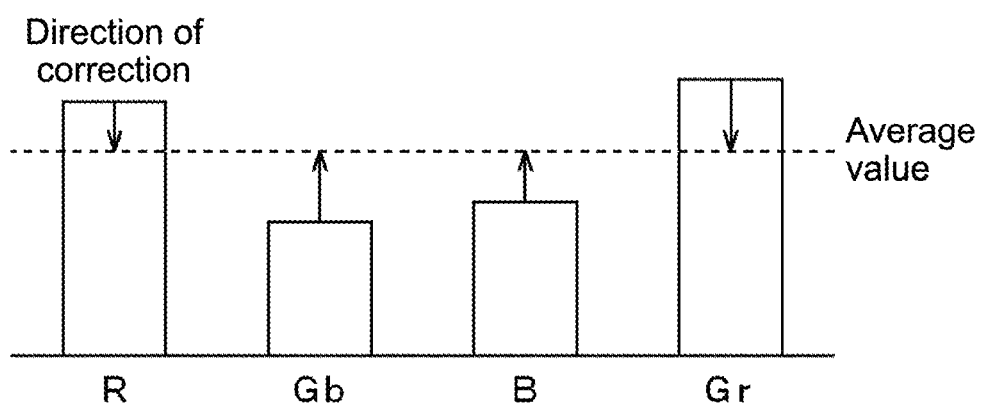
FIG. 8 is a diagram showing an example of variable characteristics of the pixels of FIG. 7.

FIG. 8 shows an example of variable characteristics of the pixels of FIG. 7. In the example of FIG. 8, the R and Gr pixels output pixel values higher than the average value of the four pixels. The Gb and B pixels output pixel values lower than the average value of the four pixels.

In the case of FIG. 8, in the color-step correction processing, the pixel values of the R and Gr pixels are corrected, i.e., decreased. The pixel values of the Gb and B pixels are corrected, i.e., increased.

Figure 9:
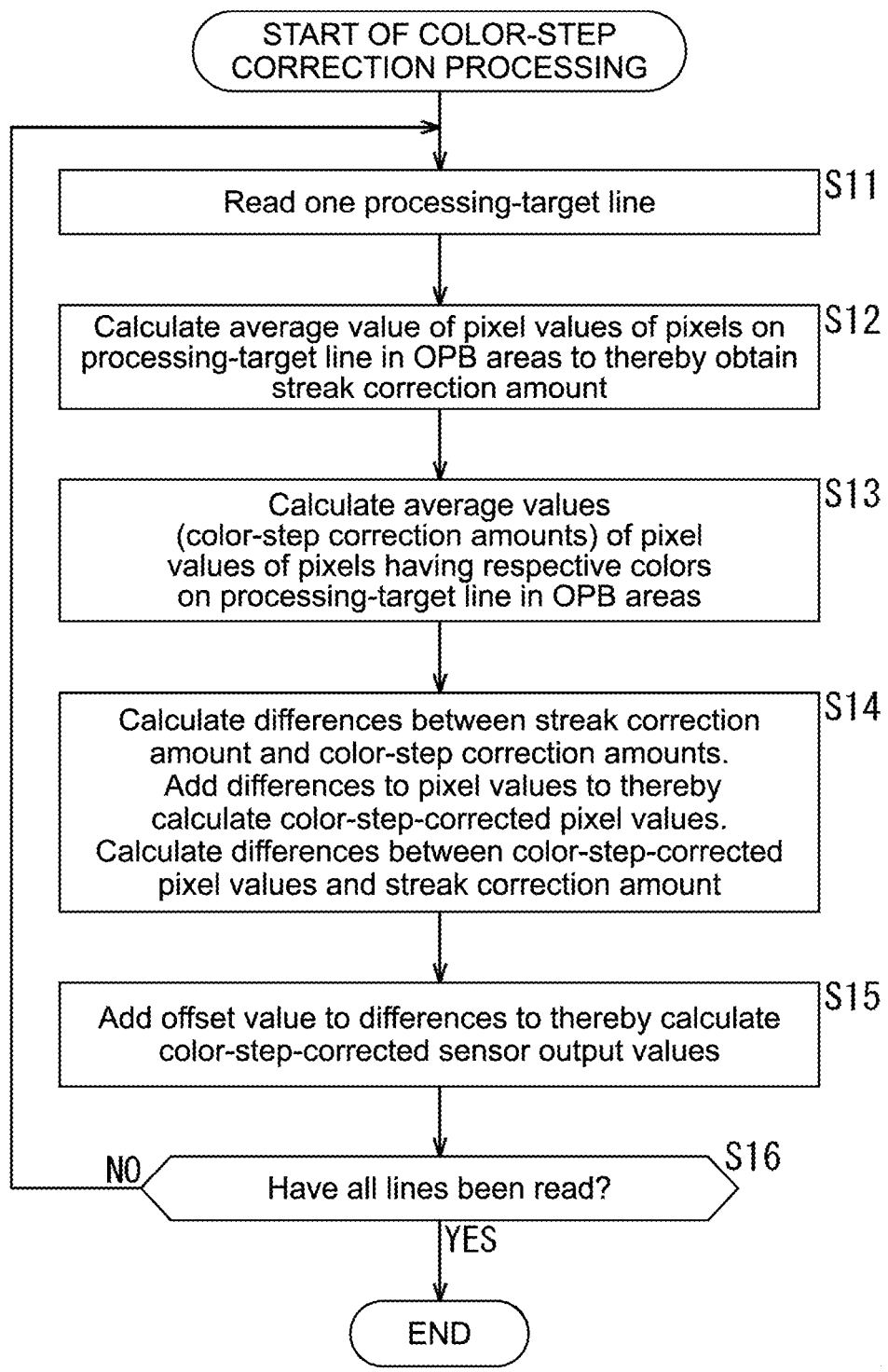
FIG. 9 is a flowchart illustrating color-step correction processing.

FIG. 9 is a flowchart illustrating the color-step correction processing. In the color-step correction processing, all the lines (pixel lines in the horizontal direction) of the pixel unit 11 are selected as processing targets and processed in order.

In Step S11, the column A/D converter 12N reads electric signals from all the pixels on one processing-target line in the upper half of the pixel unit 11. The column A/D converter 12N converts the analog electric signals to digital electric signals to thereby obtain pixel values (read data N). The column A/D converter 12N outputs the pixel values (read data N) to the correction data generating unit 14N and the correcting unit 15. The column A/D converter 12S executes Step S11 in the similar manner.

In Step S12, the correction data generating unit 14N calculates a streak correction amount, and outputs the streak correction amount to the correcting unit 15. The streak correction amount is the average value of the pixel values of all the pixels on one line in the OPB areas 22 input from the column A/D converter 12N irrespective of the color of the pixels. The column A/D converter 12S executes Step S12 in the similar manner.

In Step S13, the correction data generating unit 14N calculates the average values (R color-step correction amount, Gr color-step correction amount, B color-step correction amount, and Gb color-step correction amount) of the pixel values of the pixels having the respective colors on the one line in the OPB areas 22 input from the column A/D converter 12N. The correction data generating unit 14N outputs the average values (R color-step correction amount, Gr color-step correction amount, B color-step correction amount, and Gb color-step correction amount) to the correcting unit 15. The correction data generating unit 14S executes Step S13 in the similar manner.

In Step S14, the correcting unit 15 calculates the difference between the streak correction amount and the color-step correction amount for each color of the pixel of the upper half of the image, which are input from the correction data generating unit 14N. The correcting unit 15 adds the differences to the pixel values of the pixels having the same color on the processing-target line in the valid pixel area 21, to thereby calculate color-step-corrected pixel values. Further, the correcting unit 15 calculates the differences between the color-step-corrected pixel values and the streak correction amount. The correcting unit 15 outputs the differences to the offset adding unit 16.

Further, the correcting unit 15 calculates the difference between the streak correction amount and the color-step correction amount for each color of the pixel of the lower half of the image, which are input from the correction data generating unit 14S. The correcting unit 15 adds the differences to the pixel values of the pixels having the same color on the processing-target line in the valid pixel area 21, to thereby calculate color-step-corrected pixel values. Further, the correcting unit 15 calculates the differences between the color-step-corrected pixel values and the streak correction amount. The correcting unit 15 outputs the differences to the offset adding unit 16.

In Step S15, the offset adding unit 16 adds a predetermined offset value to the differences input from the correcting unit 15, to thereby calculate color-step-corrected sensor output values of the respective pixels. The offset adding unit 16 outputs the color-step-corrected sensor output values to the latter stage.

In Step S16, it is determined if all the lines of the pixel unit 11 have been selected as processing targets or not. If NO in Step S15 (there remains a line, which has never been selected as a processing target), the processing returns to Step S11 and the subsequent steps are executed. To the contrary, if YES in Step S15 (there remains no line, which has never been selected as a processing target), the color-step correction processing is completed.

Figure 10:
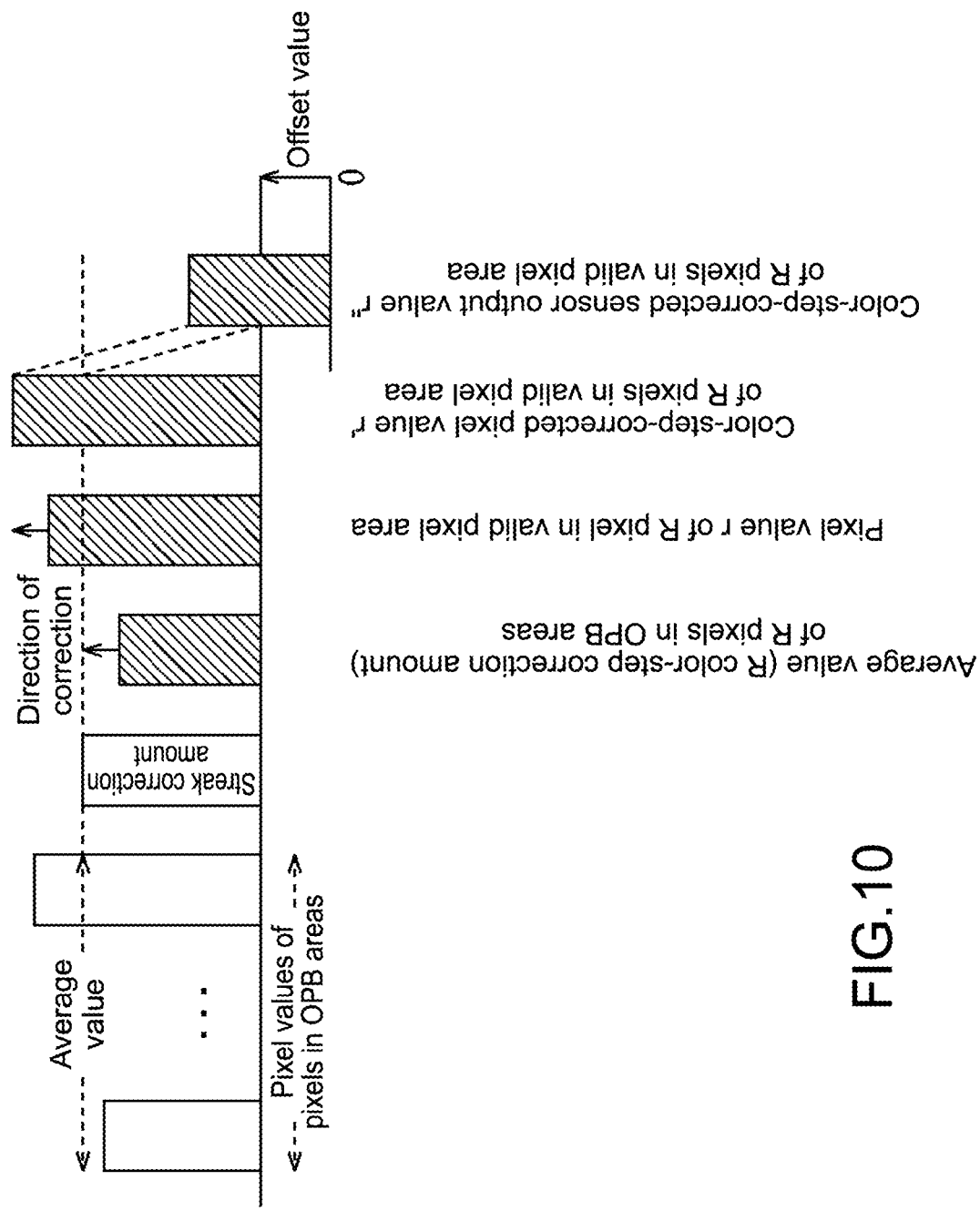
FIG. 10 is a diagram illustrating the color-step correction processing.

FIG. 10 is a specific example of the color-step correction processing for an R pixel in the valid pixel area 21.

First, the average value (streak correction amount) of the pixel values of all the pixels on one line in the OPB areas 22 is calculated. Next, the average value (R color-step correction amount) of the R pixels in the OPB areas 22 is calculated. Next, the difference between the streak correction amount and the R color-step correction amount is calculated (=streak correction amount−R color-step correction amount). The difference is added to the pixel value r of the R pixel in the valid pixel area 21, to thereby calculate the color-step-corrected pixel value r' (=r+(streak correction amount−R color-step correction amount)). Further, the difference between the color-step-corrected pixel value r' and the streak correction amount is added to the offset value, to thereby obtain the color-step-corrected sensor output value r" (=r+(streak correction amount−R color-step correction amount)−streak correction amount=r−R color-step correction amount).

Figure 11:
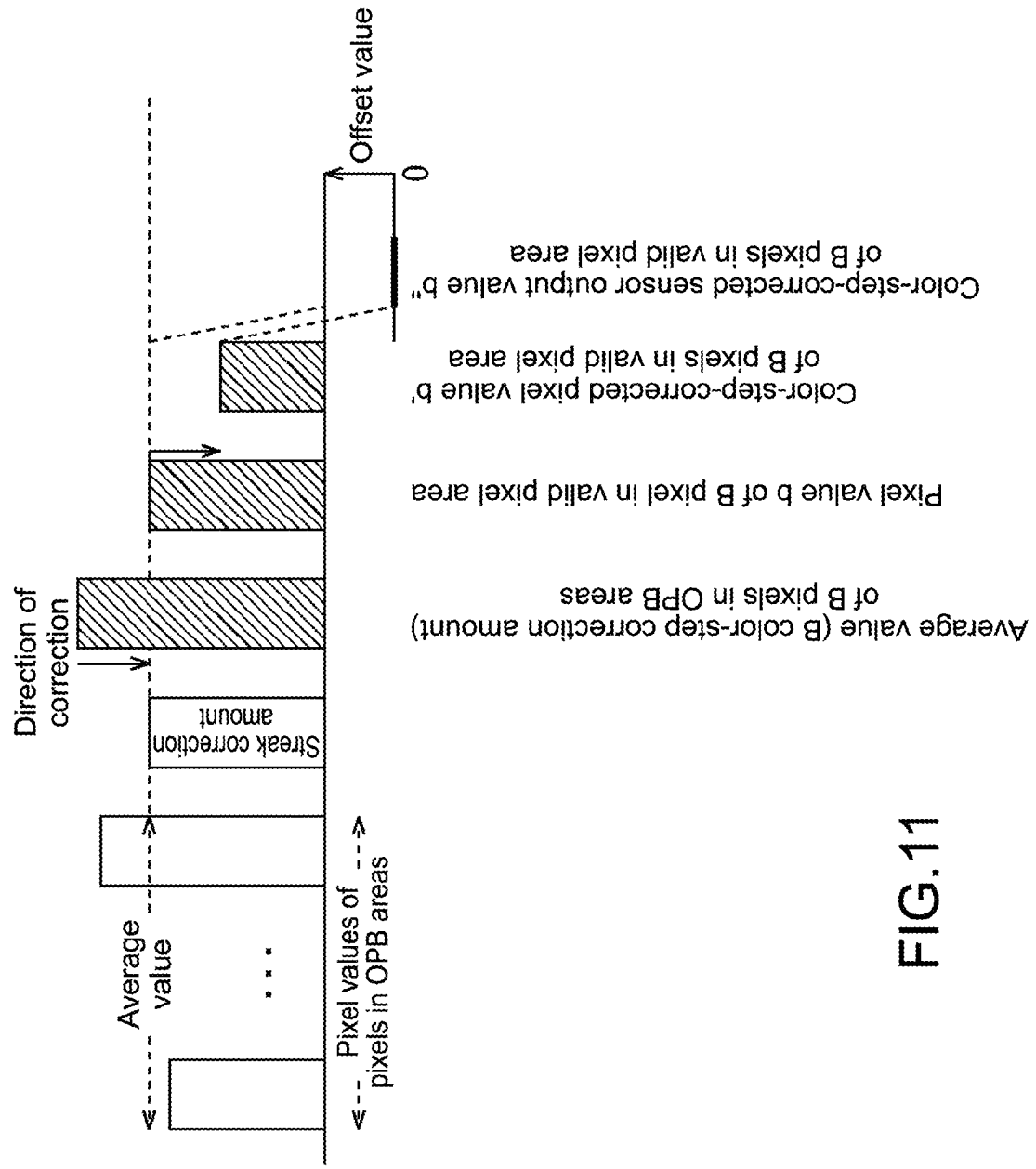
FIG. 11 is a diagram illustrating the color-step correction processing.

FIG. 11 is a specific example of the color-step correction processing for a B pixel in the valid pixel area 21.

First, the average value (streak correction amount) of the pixel values of all the pixels on one line in the OPB areas 22 is calculated. Next, the average value (B color-step correction amount) of the B pixels in the OPB areas 22 is calculated. Next, the difference between the streak correction amount and the B color-step correction amount is calculated (=streak correction amount−B color-step correction amount). The difference is added to the pixel value b of the B pixel in the valid pixel area 21, to thereby calculate the color-step-corrected pixel value b' (=b+(streak correction amount−B color-step correction amount)). Further, the difference between the color-step-corrected pixel value b' and the streak correction amount is added to the offset value, to thereby obtain the color-step-corrected sensor output value b" (=b+(streak correction amount−B color-step correction amount)−streak correction amount=b−B color-step correction amount).

As is apparent from the above-mentioned specific examples shown in FIG. 10 and FIG. 11, eventually, the color-step-corrected sensor output value of an R pixel obtained based on the color-step correction processing is "pixel value r in valid pixel area−R color-step correction amount+offset value". The color-step-corrected sensor output value of a B pixel obtained based on the color-step correction processing is "pixel value b in valid pixel area−B color-step correction amount+offset value". The same applies to a Gr pixel and a Gb pixel in the valid pixel area 21.

That is, a streak correction amount is not used to calculate a color-step-corrected sensor output value eventually. Because of this, a streak correction amount may not be calculated in Step S12, or calculation using a streak correction amount may be omitted in Step S14. Specifically, a color-step-corrected pixel value may be subtracted from a pixel value of a pixel in the valid pixel area 21, the color of the color-step-corrected pixel value being the same as the color of the pixel. Then an offset value may be added to the result, to thereby calculate a color-step-corrected sensor output value.

According to the above-mentioned color-step correction processing, each of the plurality of column A/D converters 12 calculates a streak correction amount and color-step correction amounts. With this configuration, it is possible to appropriately correct variable characteristics of pixels resulting from the column A/D converter 12.

Note that, according to this embodiment, the streak correction processing and the color-step correction processing have been described independently. They may be integrated, and a series of correction processing may be executed.

Further, according to this embodiment, pixel values of the pixels in the OPB areas 22 on a processing-target line are used to calculate a streak correction amount and color-step correction amounts. Further, pixel values of the pixels on lines (for example, at least one of upper and lower lines) in the vicinity of the processing-target line in the OPB areas 22 may be used to calculate a streak correction amount and color-step correction amounts. As a result, the correction accuracy may be further increased.

The embodiment of the present disclosure is not limited to the above-mentioned embodiment, and may be variously changed within the scope of the gist of the present disclosure.

Note that the present disclosure may employ the following configurations.

(1) A solid-state image sensor, comprising:
a pixel unit including a valid pixel area and an optical-black pixel area;
a plurality of reading units configured to read pixel values of a large number of pixels of the pixel unit line by line;
a plurality of correction data generating units corresponding to the plurality of reading units, respectively, each of the plurality of correction data generating units being configured to generate correction data based on pixel values read from the optical-black pixel area out of the pixel values read from the pixel unit by the corresponding reading unit line by line; and
a correcting unit configured to correct pixel values read from the valid pixel area out of the pixel values read from the pixel unit by the reading unit line by line based on the correction data generated by the corresponding correction data generating unit.

(2) The solid-state image sensor according to (1), wherein
each of the correction data generating units is configured to obtain an average of pixel values of all the colors read from the optical-black pixel area out of the pixel values read from the pixel unit by the reading units line by line to thereby generate a streak correction amount, and
the correcting unit is configured to calculate differences between pixel values read from the valid pixel area out of the pixel values read from the pixel unit by the reading units line by line and the streak correction amount generated by the corresponding correction data generating unit.

(3) The solid-state image sensor according to (1) or (2), wherein
each of the correction data generating units is configured to obtain, for each color, an average of pixel values of each color read from the optical-black pixel area out of the pixel value read from the pixel unit by the reading units line by line to thereby generate color-step correction amounts, and
the correcting unit is configured to calculate differences between pixel values of each color read from the valid pixel area out of the pixel values read from the pixel unit by the reading units line by line and a color-step correction amount of each color generated by the corresponding correction data generating unit.

(4) The solid-state image sensor according to (2) or (3), further comprising:
an offset adding unit configured to add the differences calculated by the correcting unit to an offset value to thereby calculate output values.

It should be understood by those skilled in the art that various modifications, combinations, sub-combinations and alterations may occur depending on design requirements and other factors insofar as they are within the scope of the appended claims or the equivalents thereof.

What is claimed is:
1. An image sensor, comprising:
a pixel unit including a valid pixel area and a plurality of optical-black pixel areas;
a plurality of A/D converters configured to read pixel values of a large number of pixels of the pixel unit line by line;
a logical block, including:
a plurality of digital correction data generators corresponding to the plurality of A/D converters, respectively, wherein one digital correction data generator is provided for each of the A/D converters in the plurality of A/D converters, wherein each digital correction data generator in the plurality of digital correction data generators is operable to generate correction data based on pixel values read from the optical-black pixel areas out of the pixel values read from the pixel unit by the corresponding A/D converter line by line;
a single difference calculator, wherein the single difference calculator is operable to receive at least first, second, third, and fourth inputs, wherein the first input includes pixel values from a first one of the A/D converters included in the plurality of A/D converters, wherein the second input includes pixel values from a second one of the A/D converters included in the plurality of A/D converters, wherein the third input includes correction data generated by a first one of the correction data generators included in the plurality of correction data generators, wherein the fourth input includes correction data generated by a second one of the correction data generators included in the plurality of correction data generators, wherein each of the digital correction data generators is configured to obtain an average of pixel values of all colors read from the optical-black pixel areas out of the pixel values read from the pixel unit by the A/D converters line by line to thereby generate a streak correction amount, wherein each of the digital correction data generators is configured to obtain, for each of the colors, an average of pixel values of each color read from the optical-black pixel area out of the pixel value read from the pixel unit by the A/D convertors line by line to thereby generate color-step correction amounts, wherein a difference between the streak correction amount for a selected line and the color-step correction amount generated for each color read from the optical-black pixel area for the selected line is calculated, wherein the calculated difference is added to pixel values of pixels in the selected line of pixels in the valid pixel area for the corresponding color to obtain color corrected output values; and a single offset adder, wherein the single offset adder is operable to receive the color corrected output values from the single output of the single difference calculator, wherein the single offset adder is operable to add a predetermined offset value to the color corrected output values, and wherein the single offset adder is operable to output color-step-corrected sensor output values.

2. The image sensor according to claim 1, wherein the plurality of A/D converters includes a first A/D converter and a second A/D converter, wherein the first A/D converter reads pixel values from each line in an upper half of the lines of the pixel unit, and wherein the second A/D converter reads pixel values from each line in a lower half of the lines of the pixel unit.

3. The image sensor according to claim 1, wherein the plurality of optical-black pixel areas includes a first optical-black pixel area and a second optical black pixel area, wherein the first optical-black pixel area corresponds to a first end of each of the lines of pixels in the pixel unit, and wherein the second optical-black pixel area corresponds to a second end of each of the lines of pixels in the pixel unit.

4. An image pickup apparatus, comprising:
an image sensor including
a pixel unit including a valid pixel area and a plurality of optical-black pixel areas,
a plurality of A/D converters configured to read pixel values of a large number of pixels of the pixel unit line by line,
a logical block, including:
a plurality of correction data generators corresponding to the plurality of A/D converters, respectively, wherein one correction data generator is provided for each of the A/D converters in the plurality of A/D converters, wherein each of the plurality of correction data generators generates correction data based on pixel values read from the optical-black pixel areas out of the pixel values read from the pixel unit by the A/D converters line by line, wherein each of the digital correction data generators is configured to obtain an average of pixel values of all colors read from the optical-black pixel areas out of the pixel values read from the pixel unit by the A/D converters line by line to thereby generate a streak correction amount, wherein each of the digital correction data generators is configured to obtain, for each of the colors, an average of pixel values of each color read from the optical-black pixel area out of the pixel value read from the pixel unit by the A/D converters line by line to thereby generate color-step correction amounts;
a single difference calculator, wherein the single difference calculator is operable to receive at least first, second, third, and fourth inputs, wherein the first input includes pixel values from a first one of the A/D converters, the second input includes pixel values from a second one of the A/D converters included in the plurality of A/D converters, the third input includes correction data generated by a first one of the correction data generators included in the plurality of correction data generators, and the fourth input includes correction data generated by a second one of the correction data generators included in the plurality of correction data generators, wherein a difference between the streak correction amount for a selected line and the color-step correction amount generated for each color read from the optical-black pixel area for the selected line is calculated, wherein the calculated difference is added to pixel values of pixels in the selected line of pixels in the valid pixel area for the corresponding color to obtain color corrected output values; and an offset adder, wherein the offset adder receives the color corrected output values, wherein the offset adder is operable to add a predetermined offset value to the color corrected output values, and wherein the offset adder outputs color-step-corrected sensor output values.

5. A correcting method employed by an image sensor including a pixel unit including a valid pixel area and a plurality of optical-black pixel areas, and a plurality of A/D converters configured to read pixel values of a large number of pixels of the pixel unit line by line, the correcting method comprising:
generating first streak correction data based on pixel values read from at least some of the plurality of optical-black pixel areas by a first one of the A/D converters included in the plurality of A/D converters, wherein a first streak correction amount is calculated, and wherein the first streak correction amount is an average of the pixel values in a first line of pixels in the optical-black pixel areas;
generating color-step correction amounts based on pixel values read from the at least some of the plurality of optical black pixel areas by the first one of the A/D converters, wherein a first color-step correction amount is calculated for a first plurality of pixel of a first color that are included in the first line of pixels in the optical-black pixel areas, and wherein the first color-step correction amount for the first color is an average of pixel values of pixels in the first line of pixels in the optical-black pixel areas having the first color;
calculating a difference between the first streak correction amount and the first color-step correction amount;
adding the difference between the first streak correction amount and first color-step correction amount to pixel values of the pixels in the first line of pixels in the valid pixel area having the first color to obtain a first set of color-step-corrected pixel values;
calculating differences between each of the color-step-corrected values in the first set of color-step-corrected pixel values and the first streak correction amount;
generating second streak correction data based on pixel values read from at least some of the plurality of optical-black pixel areas by a second one of the A/D converters included in the plurality of A/D converters, wherein a second streak correction amount is calculated, and wherein the second streak correction amount is an average of the pixel values in a second line of pixels in the optical-black pixel areas;

generating color-step correction amounts based on pixel values read from the at least some of the plurality of optical black pixel areas by the second one of the A/D converters, wherein a second color-step correction amount is calculated for a second plurality of pixels of the first color that are included in the second line of pixels in the optical-black pixel areas, and wherein the second color-step correction amount for the first color is an average of pixel values of pixels in the second line of pixels in the optical-black pixel areas having the first color;

calculating a difference between the second streak correction amount and the second color-step correction amount;

adding the difference between the second streak correction amount and second color-step correction amount to pixel values of the pixels in the second line of pixels in the valid pixel area having the first color to obtain a second set of color-step-corrected pixel values;

calculating differences between each of the color-step-corrected values in the second set of color-step-corrected pixel values and the second streak correction amount;

adding a predetermined offset value to each of the calculated differences between each of the color-step-corrected values in the first set of color-step-corrected values and the first streak correction amount to obtain first color-step-corrected sensor output values; and adding the predetermined offset value to each of the calculated differences between each of the color-step-corrected values in the second set of color-step-corrected values and the second streak correction amount to obtain second color-step-corrected sensor output values.

* * * * *